United States Patent [19]

Nemec

[11] Patent Number: 5,638,642

[45] Date of Patent: Jun. 17, 1997

[54] INSULATED FREIGHT COVER

[75] Inventor: Benjamin G. Nemec, Ingleside, Ill.

[73] Assignee: Alliance Shippers, Inc., Palos Park, Ill.

[21] Appl. No.: 289,909

[22] Filed: Aug. 12, 1994

[51] Int. Cl.$^6$ ................................................. B62D 63/04
[52] U.S. Cl. ................................ 52/3; 296/136; 150/166
[58] Field of Search ............................... 52/3; 296/136; 150/155–162, 165–167, 901

[56] References Cited

U.S. PATENT DOCUMENTS

| | | |
|---|---|---|
| 1,895,278 | 1/1933 | Crawford . |
| 2,808,093 | 10/1957 | Gilman ................................ 150/52 |
| 4,590,714 | 5/1986 | Walker ................................... 52/3 |
| 4,925,234 | 5/1990 | Park et al. ......................... 296/136 |
| 5,275,460 | 1/1994 | Kraus ................................ 52/3 X |
| 5,379,555 | 1/1995 | Strieb et al. ........................... 52/3 |
| 5,429,406 | 7/1995 | Huang ......................... 296/136 X |

OTHER PUBLICATIONS

Brochure entitled "CargoQuiltv", apparently published by UniCargo International, inc. in 1991, 2 pgs.

Brochure entitled "Astro–Cooler", apparently published by Innovative Energy, published no earlier than Apr. 1992, 2 pgs.

Brochure entitled "Insulated Blankets", apparently published by Donovan Enterprises, Inc. and believed to have been published by Nov. 17, 1992, 1 pg.

"Brochure entitled EvenTemp Insulated Pallet Covers," apparently published by Donovan Enterprises, Inc., on Jul. 11, 1990, 2 pgs.

"Products for the Transport of refrigerated Goods," apparently published as p. 11 of a larger publication by Donovan Enterprises, Inc. in Dec. 1993, 1 pg.

"Donovan Solutions", apparently published as p. 41 of a larger publication by published by Donovan Enterprises, Inc. in jun. 1993, 1 pg.

Brochure mailer entitled "Temperature control Products for the Transportation Industry", apparently published by Randall Industries, Apr. 1993, 5 pgs.

Brochures apparently published by The Schwerman Company in Apr. 1993, Jan. 1994 and other unknown times, 5 pgs.

Brochure entitled "Reflectix™ Insulin Installtion Guide & Ideas", apparently published by Reflectix, Inc., no earlier than Oct. 1992, 2 pgs.

Primary Examiner—Carl D. Friedman
Assistant Examiner—Beth A. Aubrey
Attorney, Agent, or Firm—Fitch, Even, Tabin & Flannery

[57] ABSTRACT

A rod-supported insulated freight cover for thermally protecting temperature-sensitive goods during transport. The freight cover has a front cover, a rear cover, and a series of at least three consecutively adjoined, substantially rectangular panels of insulated material. The series has a front panel, a rear panel and intermediate panels between the front and rear panels. The intermediate panels are relatively coupled along crossbound seams on two opposite edges to other panels. Some or all of the crossbound seams have rods longitudinally sewn therein. The rods provide transverse support for the freight cover, facilitating its application and removal. The rods also discourage the freight cover from receding from the side of the container after application by providing beam-like support which prevents the freight cover from falling into center voids or concavities resulting from specific load patterns and uneven load heights. Thus, a flush fit to the sidewalls is maintained throughout transport and air mixture on the sides of the container is substantially inhibited.

13 Claims, 4 Drawing Sheets

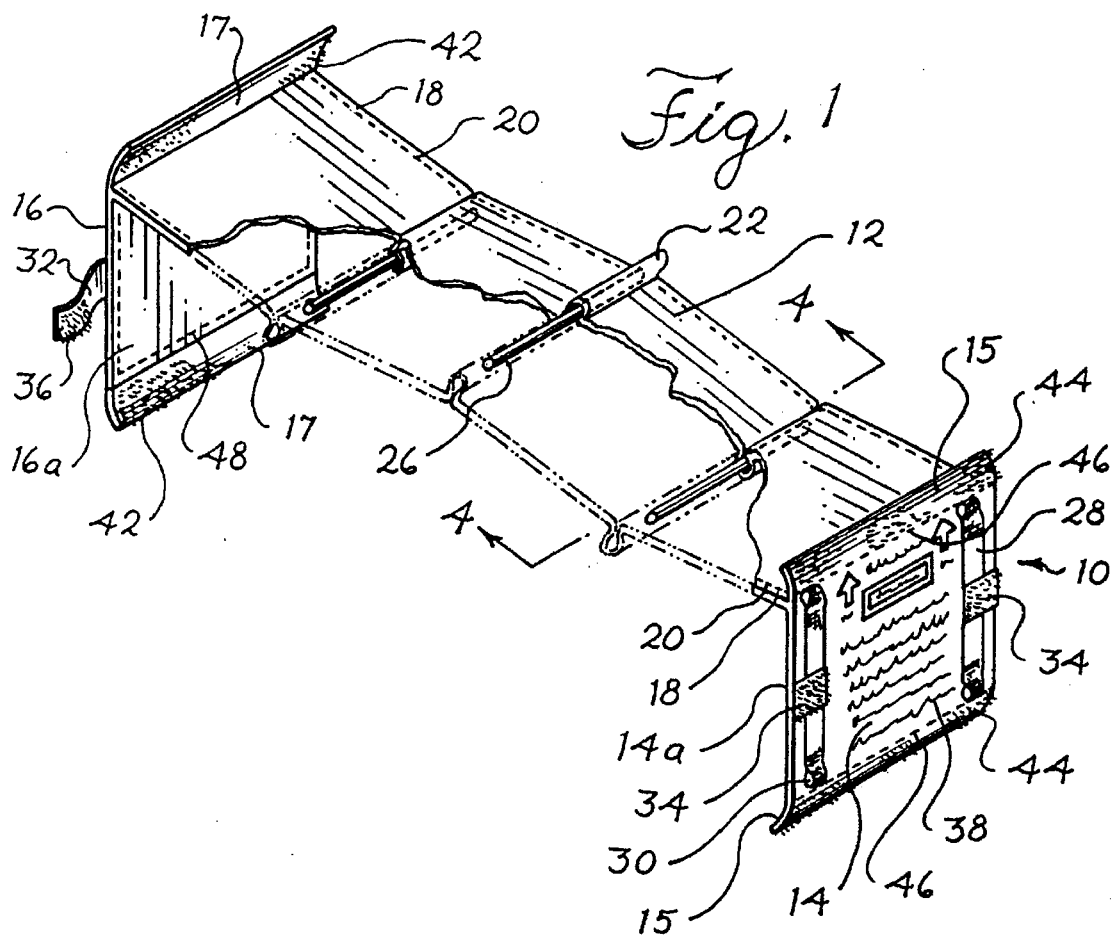
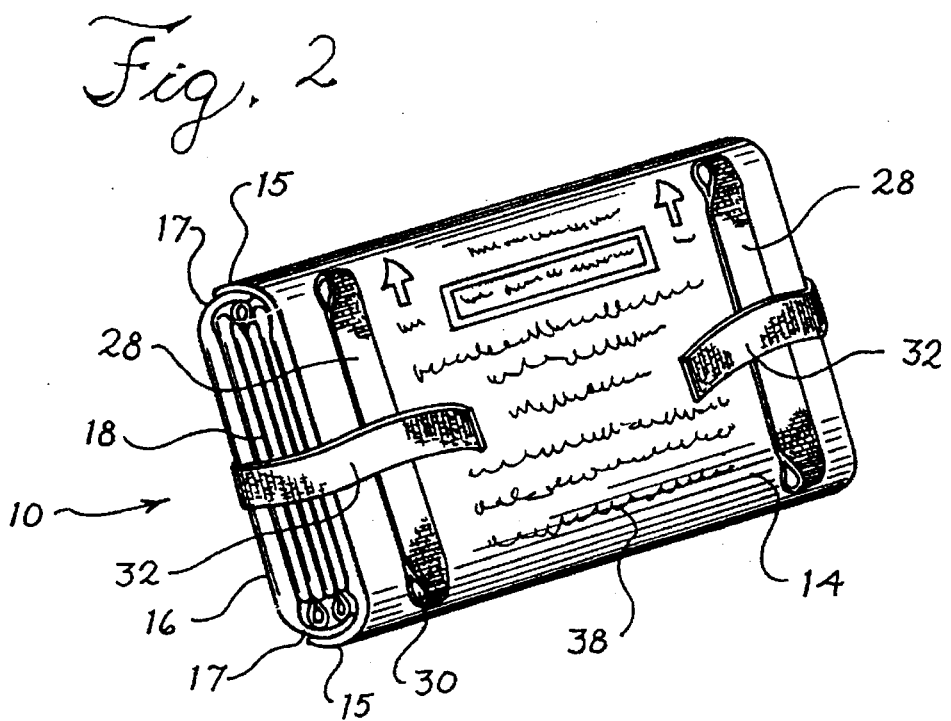

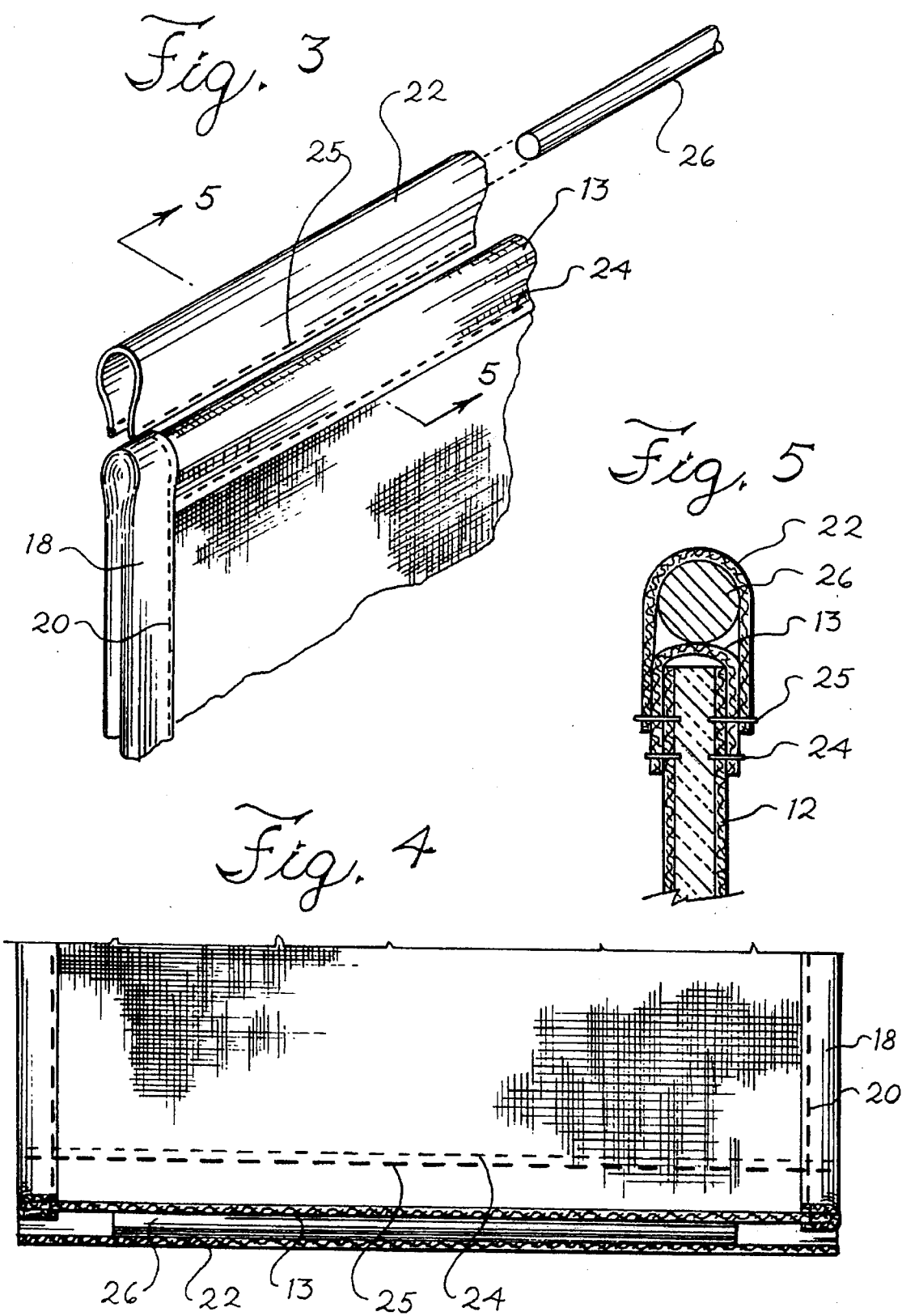

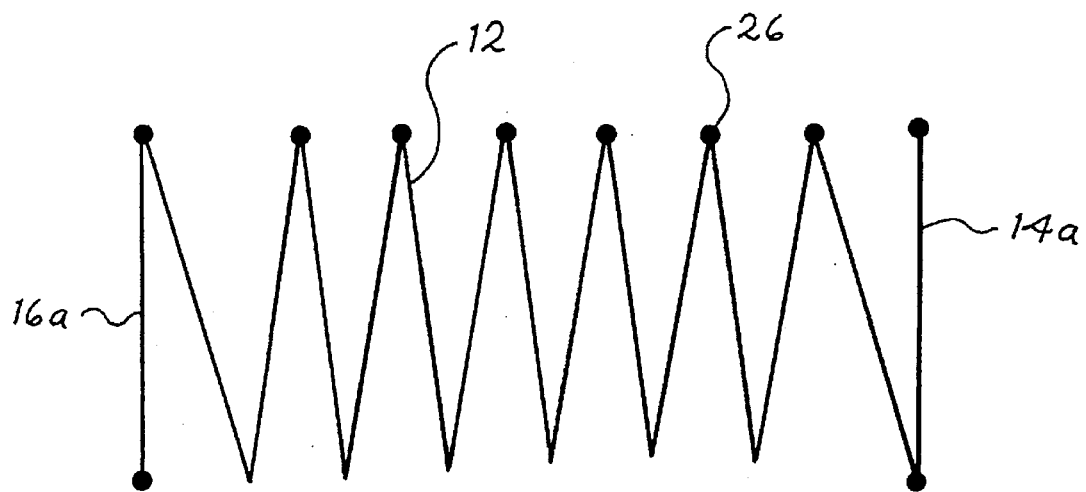
Fig. 8
Fig. 9
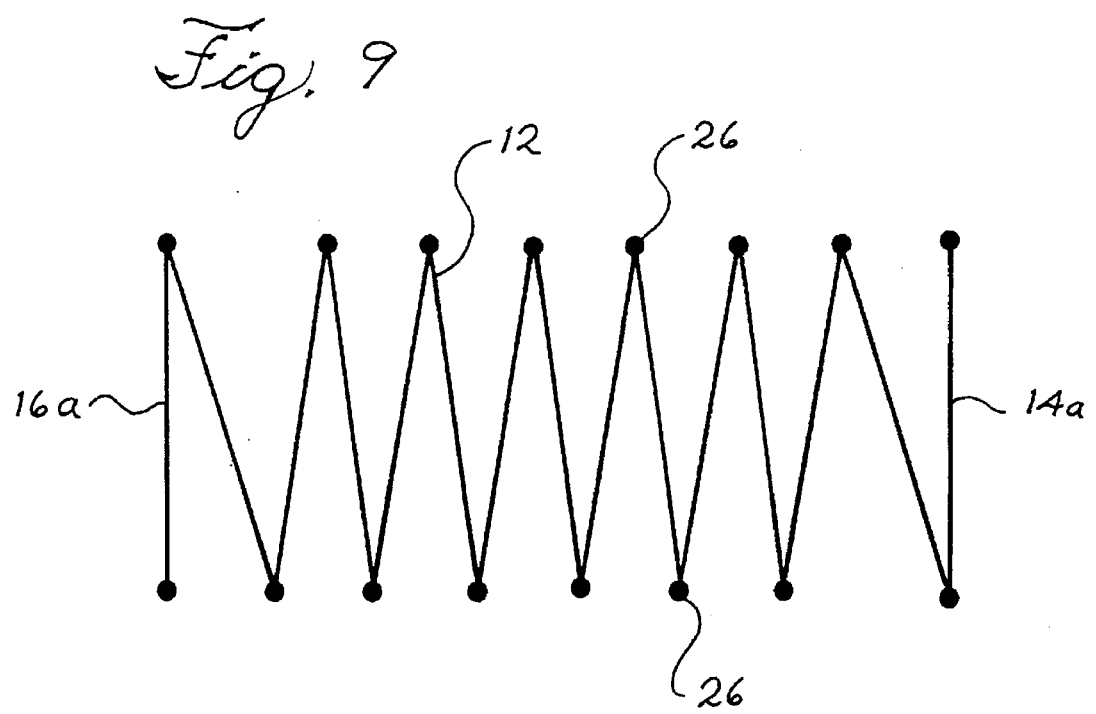

INSULATED FREIGHT COVER

BACKGROUND OF THE INVENTION

The invention generally relates to an apparatus for thermally protecting transported freight, and more particularly to an insulated freight cover.

The ability to preserve the quality of temperature-sensitive items, by maintaining temperature within certain parameters, greatly increases the practicality and efficacy of transporting such goods by rail, by road or overseas. In furtherance of this ability, thermally protective freight covers have been employed to significantly insulate the temperature-sensitive goods from the environment at large.

Freight covers are designed to maintain the temperature of goods underneath them by inhibiting heat transfer to and from the goods by completely covering the goods with an insulated cover. When used in a container, freight covers typically are placed over the top of goods, and may extend downward to cover the front and rear of the load as well as the top. The cover preferably will fit flush against the side walls of the container at the level of the top of the goods. This configuration substantially isolates the freight underneath the cover from the air above the cover inside the container. Thus, while the air above the cover is subject to significant temperature fluctuations from environmental conditions, the freight below the cover is substantially thermally protected.

Of course, the effectiveness of such freight covers depends on a large number of variables. With respect to the goods themselves, temperature capacity is a major factor, but product density, load configuration and packaging also affect the operation of the cover. Another factor is the tightness of the fit of the cover around the goods, and the corresponding rate of air mixture from below and above the cover. To the extent that temperature transfer rates are generally related to the difference in temperatures between two mediums, the environmental conditions are also very relevant.

While the potentially pronounced effect of environmental temperature deviations is obvious, other environmental parameters also contribute significantly to the effectiveness of freight covers. Air flow patterns around the cover resulting from the design and velocity of the transport vehicle may further encourage such mixing, decreasing the effectiveness of the freight cover. Thus, there is a need for an insulated freight cover which reduces the effect of these variables.

One problem with some freight covers has been the difficulty of application of the covers. Due to their size and weight, the covers are typically rather heavy, and they are typically applied over a large area in confined quarters. Thus, effective application of a cover may be quite onerous. Because the cover may catch on freight during application or due to gaps in the freight configuration, the cover may tend to sag or bunch in certain areas, making it difficult to cover the entire load and maintain an effective seal.

Another problem is the sagging of the cover in transit due to the loading configuration, which may leave part of the load uncovered. In a typical loading configuration where a freight cover may be used, a container has two rows of paired pallet loads extending the length of the container. One row of pallets is placed against each side wall, and a center void is formed. Alternatively, a side gap or a number of side gaps may be formed if the pallets are adjacent and pushed flush against a side wall.

Where a center void exists, covers tend to be pulled by their own weight into the center void, receding the cover edges away from the sides of the container and permitting air from above the cover to mix more readily with the ambient air below. This type of problem is particularly likely to occur in regions where the cover has bunched.

Where a side gap is present, the cover is higher near one side wall than near the other, and gravity combined with the natural transport movements of the container tend to cause the cover to slide laterally downward toward the lower side, receding from the opposite side wall.

Thus, it is desirable for a cover to be easily applied and to be resistant to receding from the side walls of the container.

SUMMARY OF THE INVENTION

In accordance with the present invention, there is provided an insulated freight cover for thermally protecting temperature-sensitive goods in a container during transport, the freight cover having internal supports to inhibit sagging of the cover in transit and to facilitate application and removal of the cover.

The freight cover has a front cover, a rear cover, and a series of at least three consecutively adjoined, substantially rectangular panels of insulated material. Among the panels of the series are a front panel at one end, a rear panel at the opposite end, and at least one intermediate panel between the front and rear end panels.

Each panel is hingedly coupled with at least one intermediate panel along an edgewise enclosure, such as a crossbound seam, adjoining corresponding edges of the rectangular panels. Some or all of the edgewise enclosures have internal supports, such as rods, longitudinally sewn therein. Preferably the rods are somewhat shorter than the coupled rectangular edges and are generally centrally affixed within the enclosures, permitting the cover to fold over the side edge of the freight to effect a tighter thermal seal.

The rod-supported freight cover enjoys considerable advantages over existing covers or quilts. The rods provide transverse support for the cover, inhibiting sagging and facilitating application and removal of the cover. The internal supports also discourage the cover from receding from the side of the container after application by providing beam-like support which prevents the cover from sagging into center voids or sliding laterally or sagging due to uneven load heights. Thus, a flush fit with the sidewalls may be maintained throughout transport, and air mixture on the sides of the container is substantially inhibited.

BRIEF DESCRIPTION OF THE DRAWINGS

FIG. 1 is a perspective view of a rod-supported insulated freight cover in expanded position, in accordance with a first embodiment of the invention, with a portion broken away to show interior components.

FIG. 2 is a perspective view of the cover of FIG. 1 in closed, fastened position.

FIG. 3 is a fragmentary exploded perspective view of a rod-inserted coupling of the cover of FIG. 1.

FIG. 4 is a fragmentary sectional view of a rod-inserted coupling of the cover of FIG. 1 taken substantially along the line 4-4 in FIG. 1.

FIG. 5 is a sectional view of the rod inserted coupling of FIG. 3 taken substantially along the line 5—5 in FIG. 3, shown in assembled configuration.

FIG. 8 is a schematic view of a freight cover in accordance with a second embodiment of the invention.

FIG. 9 is a schematic view of a freight cover in accordance with a third embodiment of the invention.

DETAILED DESCRIPTION OF THE ILLUSTRATED EMBODIMENTS

Figure 6:
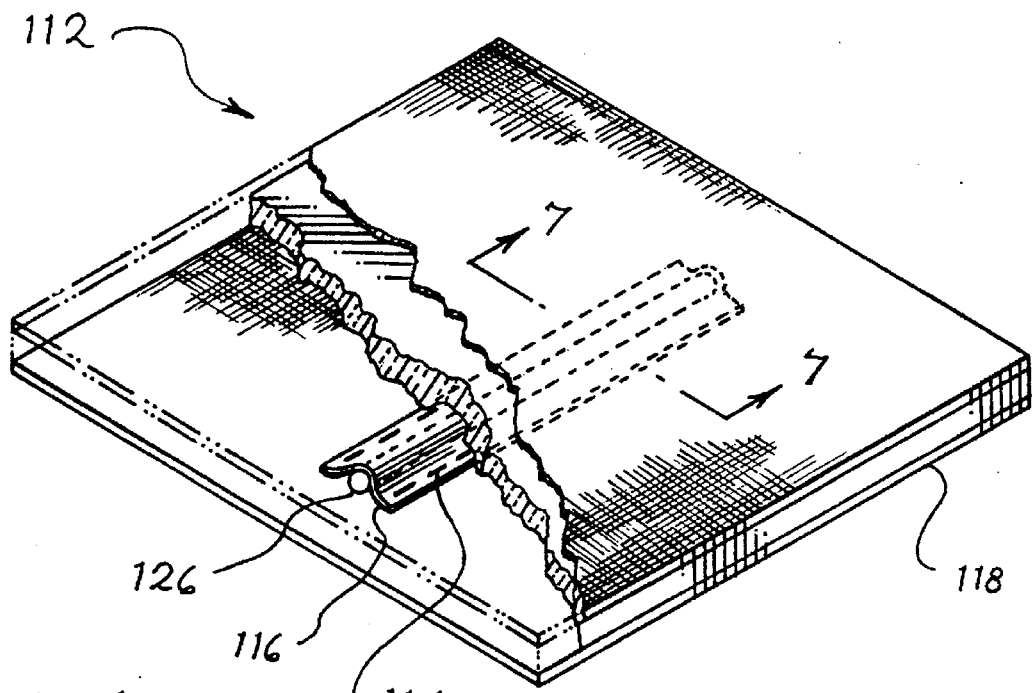
FIG. 6 is a perspective view of an insulated panel having an intermediate rod substantially centered therein in accordance with a second embodiment of the invention, with a portion broken away to show interior components.

The invention is generally embodied in an insulated freight cover for thermally protecting temperature-sensitive goods during transport.

The freight cover 10 is expandable and collapsible in accordion-like fashion through a series of coupled hinges and/or creases. The open position, as seen in FIG. 1, is where the intermediate panels 12 are not relatively folded and lie substantially in one plane. In this position, the front cover 14 and its attached front panel 14a hang down substantially perpendicularly at the front end of the freight cover 10 while the rear cover 16 and its attached rear panel 16a depend substantially perpendicularly at the rear end of the freight cover 10.

The freight cover 10 also has a closed position, as seen in FIG. 2, where the panels are alternately folded over adjacent panels to significantly reduce the amount of space needed to store the freight cover 10. There are a number of attached devices, described below, to retain the freight cover 10 in its closed position during non-use. The freight cover 10 also has a large number of intermediate positions defined by particular permutations of folds in open and closed positions. Such intermediate positions may be useful for smaller or unusual loading configurations.

The freight cover 10 has a front cover 14, a rear cover 16, and a series of at least three consecutively adjoined, substantially rectangular panels of insulated material. One end panel of the series is a front panel 14a, the opposite end panel of the series is a rear panel 16a, and the panels in between are intermediate panels 12. A first embodiment of the invention, shown in FIG. 1, has a front panel 14a, a rear panel 16a and four intermediate panels 12. Generally, the insulated material may comprise a single sheet having insulating properties, but, in the illustrated embodiments, comprises insulating material interposed between a pair of protective sheets.

In the past, insulated freight covers have been susceptible to sagging and bunching during use, and have been difficult to apply and remove. To alleviate these problems, the freight cover of the invention includes internal transverse support members as described below.

In the preferred embodiments, these members comprise lightweight, relatively stiff rods supported in edgewise enclosures in the freight cover. The rods provide transverse support for the freight cover, facilitating its application and removal. The rods also discourage the freight cover from receding from the side of the container after application by providing beam-like support which prevents the freight cover from falling into voids and by inhibiting lateral slippage when covering vertically uneven loading conditions. Thus, a flush fit with the sidewalls is maintained and air mixture on the sides of the container is substantially inhibited. It is believed that commercial freight covers similar to the invention, except for the inclusion of the internal support members, are in the prior art, and that the inclusion of these support members provides significant advantages to the freight cover described herein.

In the first embodiment, illustrated in FIG. 1, the front cover 14 and the rear cover 16 are substantially rectangular, having dimensions slightly larger than those of the front panel 14a and the rear panel 16a, respectively. The front cover 14 is sewn substantially centrally over the front panel 14a with stitching 46 and the rear cover 16 is similarly sewn over the rear panel 16a, on the opposite end of the series of panels, with stitching 48. The portions of the covers extending above and below the corresponding panels are front cover flaps 15 and rear cover flaps 17.

In the first embodiment of the invention, the front cover 14 has printed instructions, as seen in FIGS. 1 and 2, including directions as to how to best remove the freight cover from a loading application and arrows directing the user to properly orient the cover 10 prior to applying the freight cover 10 and during removal of the cover 10. The rear cover 16 may provide additional instructions to facilitate application and removal of the freight cover 10.

Woven strips 28 are sewn to the front cover 14 and rear cover 16, and each woven strip 28 has an application loop 30 at each end. The application loop 30 facilitates the application and removal of the cover 10, as described below.

Attached to the rear cover 16, extending from near the middle of one of the woven strips 28 on the rear cover 14 of the freight cover 10 is a closure strap 32 having a loop pad 36 on one side for application in a hook-and-loop type closure. The corresponding hook pad 34 covers part of the woven strip 28 attached to the front cover 14 on the same lateral side of the freight cover 10. Once the freight cover 10 is placed in closed position, the closure strap 32 may be extended around the layered panels so that the loop pad 36 presses against the hook pad 34, removably fastening the strap 32 to the front cover 14. A second such strap 32, and corresponding pads are present on the opposite side of the rear and front covers.

Another means by which the freight cover 10 is retained in its closed position is transverse hook-and-loop strips extending along the cover flaps. As seen in FIG. 1, the front cover 14 has a transverse loop strip 44 running along the top and bottom of the outer surface of its flaps 15. The rear cover 16 has corresponding transverse hook strips 42 near the top and bottom of the inside surface of its flaps 17. When the freight cover 10 is in its closed position, the flaps 15 and 17 extend over the folded panels so that the transverse hook-and-loop strips may be pressed into releasable attachment both above and below the folded cover, as seen in FIG. 2.

The open position is employed when the freight cover 10 is in use to protect its capacity load during transport. For a load significantly smaller than the capacity of the freight cover or for an unusually configured load, the freight cover 10 may be used in a partially open position so as to minimize ambient air under the cover and to form a multiply folded insulated freight cover atop the freight or on one or both longitudinal ends of the freight.

The intermediate panels 12 of insulated material may in fact be, and in the illustrated embodiments are, comprised of a single long sheet of insulated material, laminated by protective layers, which is multiply folded and transversely stitched to effectively segment the sheet into a number of panels 12 which are hingedly coupled at the folds.

As seen in FIGS. 3, 4 and 5, a continuous insulated sheet, having a reinforcing side strip 18 is sewn along opposite edges of the sheet at stitching 20 on both sides. Intermediate panels are joined by a reinforcing strip 13 sewn crosswise and perpendicular to the opposite edges of the sheet at stitching 24. A fiberglass rod 26 is longitudinally placed adjacent reinforcing strip 13, as seen in FIG. 3, and affixed centrally within a crosswise binding formed by wrapping a loop cover strip 22 around the rod 26 and affixing the cover strip 22 to the reinforcing strip 13 and the panel 12 by stitching 25, and sewn to the insulated material with stitching 24, keeping rod 26 centered between both end reinforcing side strips 18.

Figure 7:
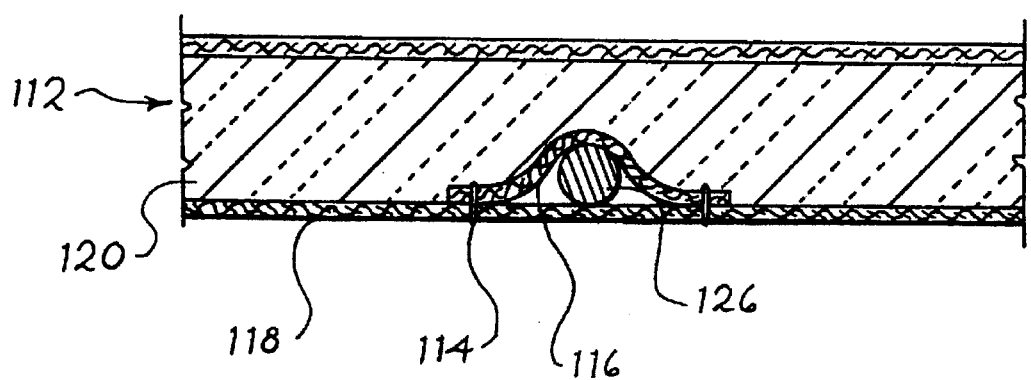
FIG. 7 is a sectional view of the intermediate panel of FIG. 6 taken substantially along the line 7—7 in FIG. 6.

It is also within the scope of the invention to provide additional transverse support directly within an insulated panel, even where no seam, fold or crease exists. As seen in FIGS. 6 and 7, wherein an insulated panel 112 comprises two protective boundary layers 118 enveloping an insulated layer 120, an intermediate rod 126 may be bound within an intermediate cover strip 116 at stitching 114, fixing the rod 126 against boundary layer 118.

The rods 26 provide rigidity to the freight covers 10 when in a closed position and thereby facilitate the initial application of the freight cover 10. Preferably, the rods 26 do not extend to the ends of the crossbound seams, permitting the edges of the freight cover 10 to fold downward against the side walls of the container, inhibiting the mixing of air from above and below the freight cover 10. The rods 26 should be at least half as long as the crossbound seams, however, to insure effectiveness against sagging over ambient air voids and uneven load heights. The rods 26 should be sufficiently rigid to support the freight cover 10 and achieve the advantages described herein, but should be sufficiently flexible to permit variable loading conditions to be adequately protected and to inhibit breakage of the rods 26.

The invention is designed to be applied in containers fitting two pallets of freight across, but it is not constrained to such an application. Although each row across the container will preferably have two pallets, one placed at the left-hand side wall of the container and one placed at the right-hand side wall of the container, between any two such rows may be placed a single row of one, centrally placed pallet of freight. Another common loading configuration to which the freight cover may be applied is alternating rows of two adjacent pallets flush against one of the side walls of the container.

The preferred method of application of the freight cover to freight configurations conforming with those just described, as well as for most other configurations, comprises the following steps.

Initially, the first row of two pallets is loaded into the nose of the container directly against the left-hand and right-hand side walls. The freight cover 10 is then oriented with the flap 15 of the front cover 14 pointing upwardly with the top of the freight cover 10 pointing toward the nose of the container, as indicated by the printed instructions and instructional arrows 38. The nose end transverse hook-and-loop strips 42 and 44 are then disengaged and the flap 15 of the front cover 14 is folded back over itself. The freight cover 10 is then moved to the nose of the container atop the first row of pallets and pushed firmly forward to insure that it is flush to the nose and properly centered. The rear end transverse hook-and-loop strip is then released and the flap 17 of the rear cover 16 is partly folded under itself to insure that it is not caught by subsequently loaded pallets. The next step is to release the closure straps 32 and to place the dangling straps under the first fold of the freight cover 10 to keep them from obstructing the application and subsequent removal of the full freight cover 10. Pull cords are then attached to the application loops 30 on each side of the front cover 14 of the freight cover 10. The cords are then taken to the rear of the container and placed or tied up so as not to hinder subsequent loading. The remaining freight is then loaded into the container, insuring that the pallets are loaded directly against the left-hand and right-hand side walls of the container. Better cover fit against the side walls of the container is achieved if the rows of pallets are relatively equal in height.

After all the freight has been loaded, the pull cords on both sides of the container are pulled simultaneously to pull and unfold the freight cover over the load until the front cover 14 is at the rear of the container. The pull cords can then be removed and stored for future use. The front cover 14 is then pulled down the rear of the load flush to the floor of the container, leaving the freight substantially covered by the freight cover which is substantially flush to the nose, flush to the sides and flush to the floor.

The front cover 14 of the freight cover 10 faces out toward the rear doors of the container. Instructions for the removal of the freight cover 10 are printed on the front cover 14, as seen in FIG. 2. Removal of the cover 10 is preferably achieved by performing the following steps.

The front cover 14 is grasped by the upper application loops 30 and pulled out and set down on the dock with the printed side down against the floor. The remainder of the freight cover 10 is removed by grasping and pulling the intermediate panels 12 by every other crosswise binding, folding the panels 12 onto the front cover 14 until the rear cover 16 is removed. Where panels have creases running substantially centrally therethrough, the freight cover 10 may be removed by sequentially pulling on each crosswise binding. The freight cover 10 is then secured in the closed position by reapplying the woven straps 32 and their hook pads 34 to corresponding loop pads 36 so that hook pads 34 and loop pads 36 are completely engaged and by subsequently reapplying the transverse hook strips 42 to the corresponding transverse loop strips 44. The freight cover 10 can then be moved to a storage position, so as not to hinder the unloading of the container.

Freight covers in accordance with the invention can be stacked on top of one another to reduce the amount of storage space required.

The first embodiment of the invention has 4 intermediate panels, as seen in FIG. 1. A larger, second embodiment of the invention, schematically represented in FIG. 8, has 13 intermediate panels, each panel being approximately 4 feet by 106 inches. Alternatively, the panels may be approximately 8 feet long, each panel having a crease running substantially centrally therethrough. This second embodiment is designed for a container not exceeding 102 inches across, permitting the side edges of the panels to be forced against the side walls of the container and controlling freight temperature change by inhibiting the mixing of air under the cover with the air above the cover. The second embodiment of the freight cover has an operational coverage length of approximately 60 feet of freight. The placement of rods 26 in this embodiment is marked in schematic FIG. 8 by filled circles. A third embodiment of the invention is depicted in schematic FIG. 9 and has additional rods inserted into intermediate folds, relative to the second embodiment.

When secured in its closed position, the second and third embodiments are approximately 106 inches wide and 4 feet from front to back. They stand about 20 to 22 inches high and weigh approximately 60 pounds.

A fourth embodiment of the invention has eight intermediate panels, each approximately 4 feet by 106 inches, and therefore has a maximum coverage length of approximately 32 feet.

From the foregoing, it will be appreciated that the invention provides a novel and improved freight thermal freight cover. The invention is not limited to any of the embodiments described above or to any specific embodiment. In particular, there is no intent to limit the number or size of panels in a freight cover in accordance with the invention. Rather, variations including, but not limited to, the embodiments described above are within the scope of the invention.

Terms such as "above", "below", etc., to the extent that they are used to describe the structure of the present invention, refer only to the orientation and relative position of the various components of the embodiments described. The use of these terms is not intended to limit the claims to a particular embodiment described above or to any particular embodiment of a freight cover. Nor should the use of such terms in describing the application or removal of the invention be construed to limit the scope of the claims to a freight cover disposed in a particular orientation.

The invention is described in the following claims.

What is claimed is:

1. A freight cover for thermally protecting temperature-sensitive goods, said freight cover comprising:

a series of at least three consecutively adjoined, substantially rectangular panels of insulated material, said series having a first end panel at one end of said series, a second end panel at the opposite end of said series, and at least one intermediate panel between said first end panel and said second end panel, each of said end panels being hingedly coupled with one of said intermediate panels at an edgewise enclosure connecting corresponding edges of said panels, each of said intermediate panels being hingedly coupled along opposite edges with two other of said panels at edgewise enclosures connecting corresponding edges of said panels;

a substantially rectangular front cover connected to said first end panel;

a substantially rectangular rear cover connected to said second end panel; and a relatively stiff elongated support member longitudinally inserted and affixed within at least one of said edgewise enclosures.

2. A freight cover in accordance with claim 1 wherein said elongated support member is at least half as long, but substantially shorter than said edgewise enclosure and said elongated member is substantially centrally affixed therein.

3. A freight cover in accordance with claim 1 having thirteen intermediate panels between said first end panel and said second end panel.

4. A freight cover in accordance with claim 1 wherein each of said intermediate panels has a crease running substantially centrally therethrough, said crease being parallel to one of said edgewise enclosures connecting said panel to one of said other panels, said edgewise enclosures connected to said intermediate panel being adjacently disposed when said crease is in a folded position.

5. A freight cover in accordance with claim 4 wherein said cover has a relatively stiff elongated support member affixed within each of said intermediate panels in substantial coincidence with said crease running substantially through said panel.

6. A freight cover in accordance with claim 5 having six intermediate panels approximately eight feet long and 106 inches wide and one intermediate panel approximately four feet long and 106 inches wide, said six panels each having a crease running substantially centrally therethrough, said creases being substantially parallel to said edgewise enclosures, each of said six intermediate panels having a relatively stiff elongated support member affixed therein in substantial coincidence with said crease running substantially therethrough.

7. A freight cover in accordance with claim 1 wherein each of said edgewise enclosures comprises a seam, said seam comprising material stitched to each of the two panels which are hingedly coupled at said edgewise enclosure.

8. A freight cover in accordance with claim 1 wherein at least one of said panels of insulative material comprises a thermally insulative material interposed between a pair of protective sheets.

9. A freight cover for thermally protecting temperature-sensitive goods, said freight cover comprising:

an elongated insulated cover having a front end and a rear end;

a plurality of transverse support members in said cover such that when said cover is laid over said goods said transverse support members inhibit sagging of said cover into concavities caused by the configuration of said goods; and a series of at least three consecutively adjoined, substantially rectangular panels of insulated material, said series having a front end panel at one end of said series, a rear end panel at the opposite end of said series, and at least one intermediate panel between said front end panel and said rear end panel wherein one of said plurality of transverse support members comprises a relatively stiff elongated support member disposed within one of said intermediate panels such that said support member provides additional rigidity to said freight cover.

10. A freight cover for thermally protecting temperature-sensitive goods, said freight cover comprising:

a series of at least three consecutively adjoined, substantially rectangular panels said series having a first end panel at one end of said series, a second end panel at the opposite end of said series, and at least one intermediate panel, approximately 4 feet by 106 inches, of insulated material, between said first end panel and said second end panel, each of said end panels being hingedly coupled with one of said intermediate panels at a seam connecting corresponding edges of said panels, each of said intermediate panels being hingedly coupled along opposite edges with two other of said panels at seams connecting corresponding edges of said panels, each of said intermediate panels having a crease running substantially centrally therethrough, said crease being parallel to one of said seams connecting said panel to one of said other panels, said seams being adjacently disposed when said crease is in a folded position;

a substantially rectangular front cover connected to said first end panel;

a substantially rectangular rear cover connected to said second end panel; and a relatively stiff elongated support member longitudinally inserted and affixed within at least one of said seams, said elongated member being at least half as long, but substantially shorter than said seams and said elongated member being substantially centrally affixed therein.

11. A freight cover in accordance with claim 1 wherein at least one of said front cover and said rear cover includes an extending flap; said flap having means for attaching to the other of said covers such that said freight cover may be retained in a closed position by said means for attaching.

12. A freight cover in accordance with claim 10 wherein at least one of said front cover and said rear cover includes an extending flap, said flap having means for attaching to the other of said covers such that said freight cover may be retained in a closed position by said means for attaching.

13. A freight cover in accordance with claim 10 wherein at least one of said panels of insulative material comprises a thermally insulative material interposed between a pair of protective sheets.

* * * * *